United States Patent
Tung et al.

(10) Patent No.: US 11,740,400 B2
(45) Date of Patent: Aug. 29, 2023

(54) LIGHT GUIDE PLATE, FRONT LIGHT MODULE, AND DISPLAY DEVICE

(71) Applicant: Radiant Opto-Electronics Corporation, Kaohsiung (TW)

(72) Inventors: Kuo-Cheng Tung, Kaohsiung (TW); Hao Chen, Kaohsiung (TW); Chin-Ting Weng, Kaohsiung (TW); Chia-Yin Chang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/075,107

(22) Filed: Dec. 5, 2022

(65) Prior Publication Data
US 2023/0185013 A1    Jun. 15, 2023

(30) Foreign Application Priority Data
Dec. 9, 2021   (CN) .......................... 202111501461.3

(51) Int. Cl.
*F21V 8/00*    (2006.01)
(52) U.S. Cl.
CPC .................................. *G02B 6/0038* (2013.01)
(58) Field of Classification Search
CPC .............................. G02B 6/0038; G02B 6/005
See application file for complete search history.

(56) References Cited

U.S. PATENT DOCUMENTS

| | | | | |
|---|---|---|---|---|
| 5,999,685 A * | 12/1999 | Goto | ..................... | G02B 6/0038 362/617 |
| 7,581,868 B2* | 9/2009 | Kim | ..................... | G02B 6/0038 362/628 |
| 8,939,594 B2* | 1/2015 | Miyazaki | ............. | G02B 6/0055 362/624 |
| 2003/0169386 A1 | 9/2003 | Goto et al. | | |
| 2012/0218775 A1 | 8/2012 | Nakada | | |
| 2013/0163279 A1* | 6/2013 | Peng | ...................... | G02B 6/002 362/609 |
| 2019/0064598 A1* | 2/2019 | Du | ....................... | G02B 6/0016 |

FOREIGN PATENT DOCUMENTS

| | | |
|---|---|---|
| CN | 102155694 A | 8/2011 |
| CN | 102269839 A | 12/2011 |
| CN | 102981207 A | 3/2013 |

(Continued)

*Primary Examiner* — Karabi Guharay
(74) *Attorney, Agent, or Firm* — RABIN & BERDO, P.C.

(57) ABSTRACT

A light guide plate has a top side and a bottom side that are opposite to each other, and has a light-incident surface, a light-emitting surface, multiple light guide structures, and an inclined surface structure. The light-incident surface is located at an end of the light guide plate. The light-emitting surface is located on the top side of the light guide plate and is connected to the light-incident surface. The light guide structures are disposed on the light-emitting surface, and each one of the light guide structures has a light-facing surface and an opposite light-facing surface connected to a side of the light-facing surface away from the light-incident surface. The inclined surface structure is connected to the light-incident surface and the bottom side of the light guide plate. A front light module having the light guide plate and a display device having the front light module are also provided.

13 Claims, 4 Drawing Sheets

(56) References Cited

FOREIGN PATENT DOCUMENTS

| | | | |
|---|---|---|---|
| CN | 106094097 A | 11/2016 |
| CN | 106104316 A | 11/2016 |
| CN | 107561630 A | 1/2018 |
| JP | 2005128567 A | 5/2005 |
| JP | 2015118750 A | 6/2015 |
| TW | 200839328 A | 10/2008 |
| TW | 201350941 A | 12/2013 |

\* cited by examiner

LIGHT GUIDE PLATE, FRONT LIGHT MODULE, AND DISPLAY DEVICE

BACKGROUND OF THE INVENTION

1. Field of the Invention

The present invention relates to a light guide plate, and more particularly to a light guide plate being capable of improving light-emitting brightness, a front light module having the light guide plate, and a display device having the front light module.

2. Description of Related Art

Nowadays, an e-book reader utilizes a conventional front-light display device for users to clearly see a content displayed by the e-book reader whether in a weak-light or bright-light ambient illumination. The conventional front-light display device has a front light module and a display panel. The front light module has a light guide plate and a light-emitting unit which are disposed nearby. The light guide plate has a light-emitting surface. Light emitted by the light-emitting unit enters an end of the light guide plate, and is refracted by the light guide plate and emitted to the display panel. The display panel further reflects and emits the light from the light-emitting surface into the user's eyes. The conventional front-light display device performs a better image by reflection and can avoid interference in a bright-light ambient illumination.

When the light-emitting unit projects light toward the light guide plate, there is an included angle between an optical axis and a direction of light traveling. When the included angle is small enough, e.g. less than 10 degrees, the light which emitted from the light emitting surface can successfully enter the user's eyes in a normal angle of view within an offset between ±15 degrees. On the other hand, when the included angle is too large, e.g. over 10 degrees, a light-emitting angle increases, so that the light cannot be efficiently received by the user's eyes. In other words, the light-emitting angle at the light-emitting surface is too divergent to emit in a normal angle of view within an offset between ±15 degrees, which causes low brightness of the conventional front-light display device. Therefore, the conventional front-light display device has room for improvement.

SUMMARY OF THE INVENTION

The main objective of the present invention is to provide a light guide plate so as to overcome the shortcoming of low light-emitting brightness of the conventional front-light display device.

To fulfill the main objective of the present invention, the light guide plate of the present invention has a top side and a bottom side that are opposite to each other, and comprises a light-incident surface, a light-emitting surface, multiple light guide structures, and an inclined surface structure. The light-incident surface is located at an end of the light guide plate. The light-emitting surface is located on the top side of the light guide plate and is connected to the light-incident surface. The multiple light guide structures are disposed on the light-emitting surface of the light guide plate, and each one of the multiple light guide structures has a light-facing surface and an opposite light-facing surface connected to a side of the light-facing surface away from the light-incident surface. The inclined surface structure is connected to the light-incident surface and the bottom side of the light guide plate.

To fulfill the main objective, the present invention further provides a front light module. The front light module comprises the light guide plate as described above, and a light-emitting unit configured to emit light toward the light incident surface of the light guide plate.

To fulfill the main objective, the present invention further provides a display device. The display device comprises the front light module as described above, and a display panel disposed at a spaced interval from the bottom side of the light guide plate.

With the inclined surface structure of the light guide plate, rays with greater incident angle emitted by the light-emitting unit which is over 10 degrees can be efficiently transmitted to a rear of the light guide plate. After reflected by the inclined surface structure, the rays with greater incident angle can be reflected toward the bottom side of the light guide plate at a better angle. Through further reflection by the display panel and guidance by the light guide structures, the rays can be emitted at a smaller angle of refraction. As light utilization efficiency of the rays with greater incident angle increases, light-emitting brightness at the in-needed viewing angle of the overall module is improved, especially light-emitting brightness in a normal angle of view within an offset between ±15 degrees, and light-emitting brightness of the display device of the present invention is also improved.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
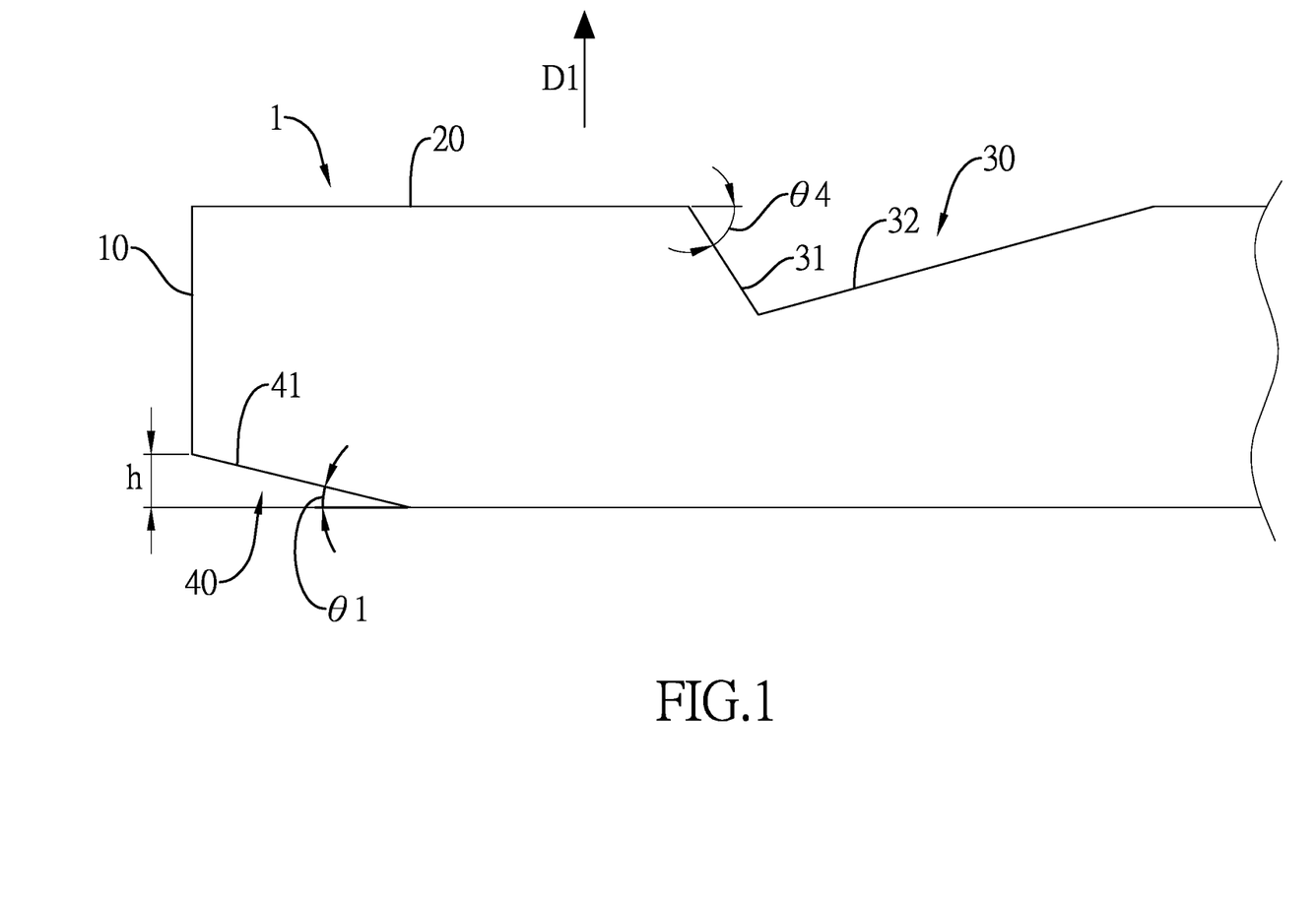
FIG. 1 is an enlarged side view of a first embodiment of a light guide plate in accordance with the present invention.
Figure 2:
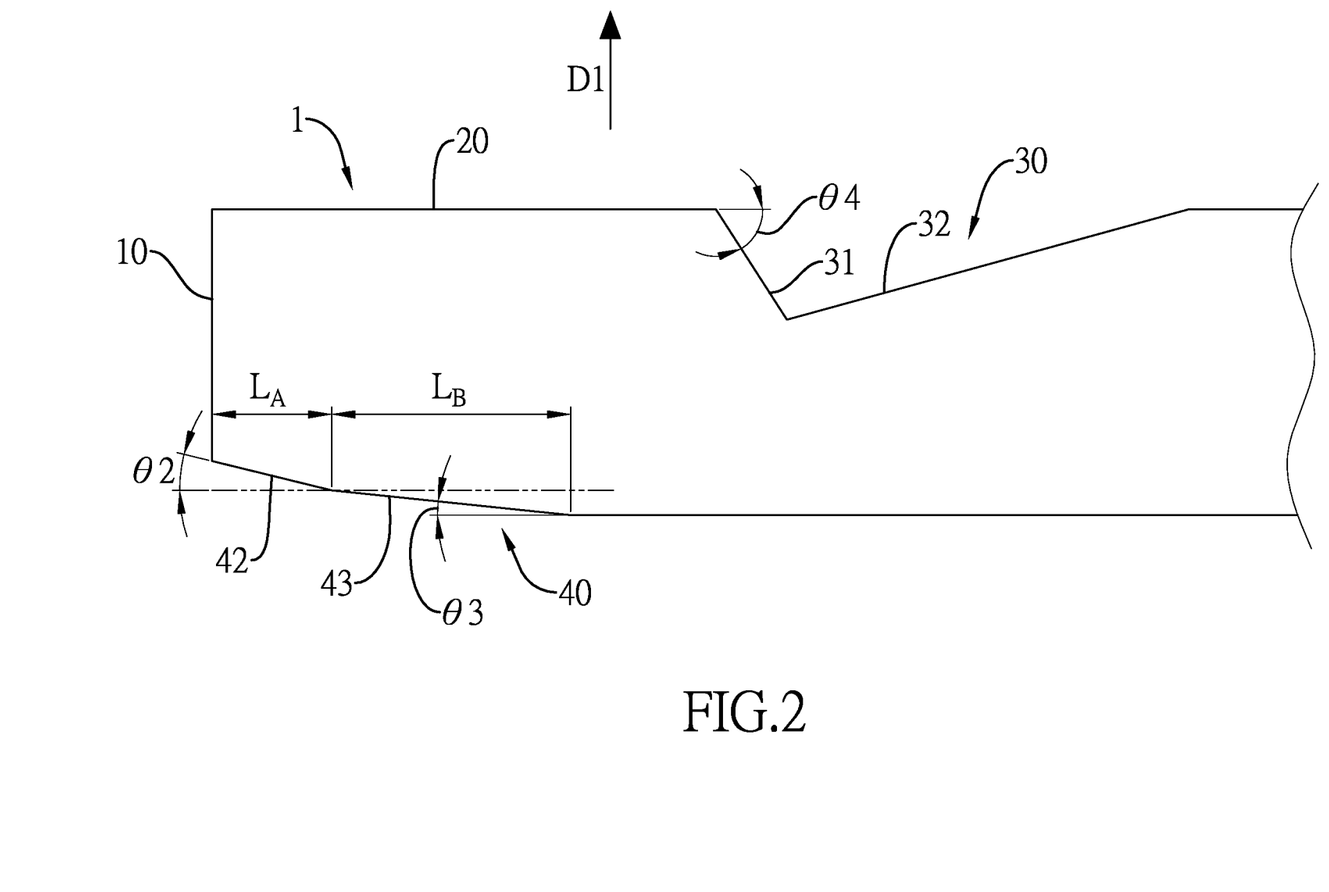
FIG. 2 is an enlarged side view of a second embodiment of a light guide plate in accordance with the present invention.

With reference to FIGS. 1 and 2, the present invention provides multiple embodiments of a light guide plate 1 in accordance with the present invention, which has a top side and a bottom side that are opposite to each other, and the light guide plate 1 comprises a light-incident surface 10, a light-emitting surface 20, multiple light guide structures 30, and an inclined surface structure 40.

With reference to FIGS. 1 and 2, the light-incident surface 10 is located at an end of the light guide plate 1. The light-emitting surface 20 is located on the top side of the light guide plate 1 and is connected to the light-incident surface 10. Light can enter the light guide plate 1 from the light-incident surface 10 and emit out from the light-emitting surface 20.

With reference to FIGS. 1 to 4, the multiple light guide structures 30 are disposed on the light-emitting surface 20 of the light guide plate 1, and each one of the multiple light guide structures 30 has a light-facing surface 31 and an opposite light-facing surface 32. The opposite light-facing surface 32 is connected to a side of the light-facing surface 31 away from the light-incident surface 10. When projected toward the light-facing surface 31, the light will be reflected toward and out of the bottom side of the light guide plate 1. Then the light will be reflected back into the light guide plate 1 by a reflective member such as a reflector or a reflective display shown as numeric 60 in FIG. 4 and toward the opposite light-facing surface 32 to be refracted out of the light guide plate 1. Thereby, it is possible to control light paths that are emitted from the light-emitting surface 20 of the light guide plate 1.

With reference to FIGS. 1 and 2, the inclined surface structure 40 is connected to the light-incident surface 10 and the bottom side of the light guide plate 1, and is configured to control light paths of the light entering the light guide plate 1 to project the light toward the light-facing surfaces 31 of the multiple light guide structures 30, so as to improve light utilization efficiency.

Furthermore, with reference to FIG. 1, in a first embodiment of the light guide plate 1 in accordance with the present invention, the inclined surface structure 40 comprises a first inclined surface 41, and a first angle (also defined as an inclined surface angle) θ1 is included by the first inclined surface 41 and the bottom side of the light guide plate 1. The first angle θ1 is an external angle, is larger than 0 degree and is smaller than or equal to 8 degrees, i.e. 0°<θ1≤8°. When projected toward the first inclined surface 41, the light will be reflected.

A fourth angle (also defined as a light-facing surface angle) θ4 is included by the light-facing surface 31 of each one of the multiple light guide structures 30 and the light-emitting surface 20. The fourth angle θ4 is an external angle, is larger than 42 degrees and is smaller than or equal to 46 degrees, i.e. 42°<θ4≤46°. By designing the fourth angle θ4 within a predetermined angle, the light-facing surfaces 31 of the multiple light guide structures 30 can receive light reflected by the first inclined surface 41 and further reflect the light toward the bottom side of the light guide plate 1. In the present invention, the fourth angle θ4 is a sum of a half of the first angle θ1 plus 42 degrees, i.e. θ4=0.5×θ1+42°. As the fourth angle θ4 varies with the first angle θ1 of the first inclined surface 41, the light may be reflected by the light-facing surface 31 toward the bottom side of the light guide plate 1 at a more effective angle, so as to improve light utilization efficiency.

Figure 3:
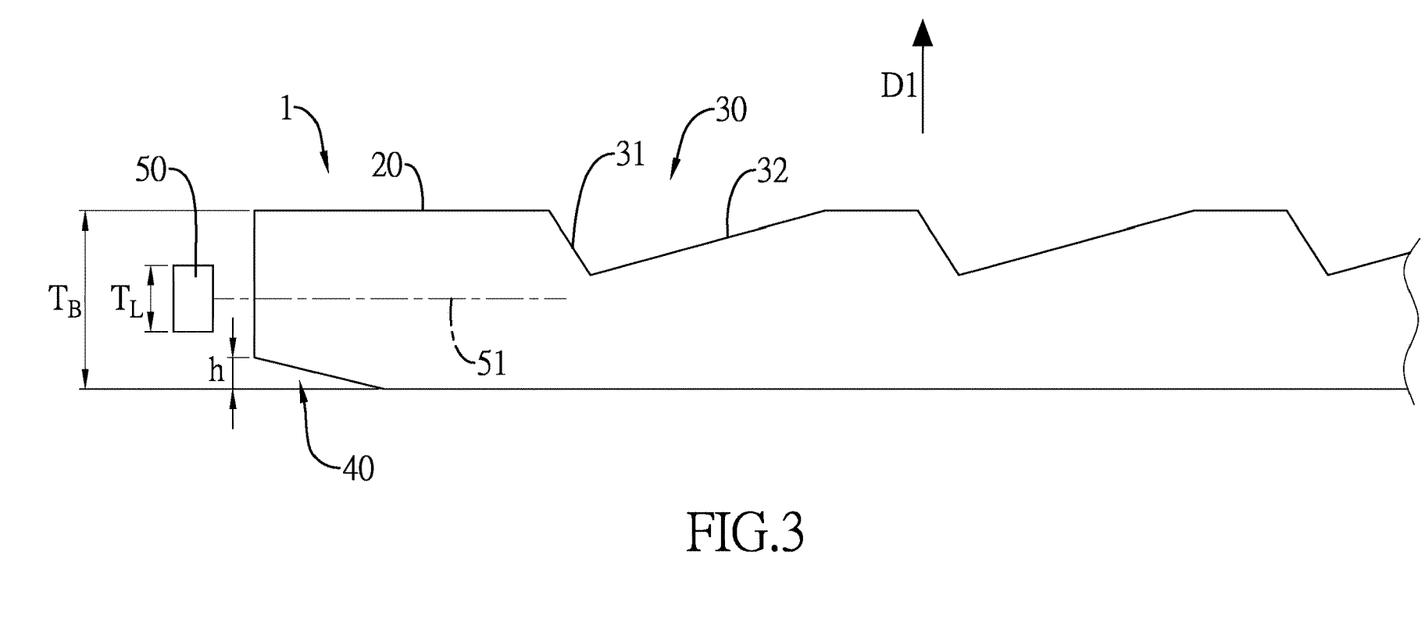
FIG. 3 is an enlarged side view of a front light module in accordance with the present invention.

With reference to FIG. 3, an embodiment of a front light module in accordance with the present invention comprises the light guide plate 1 as described above and a light-emitting unit 50 configured to emit light toward the light incident surface 10 of the light guide plate 1.

Figure 4:
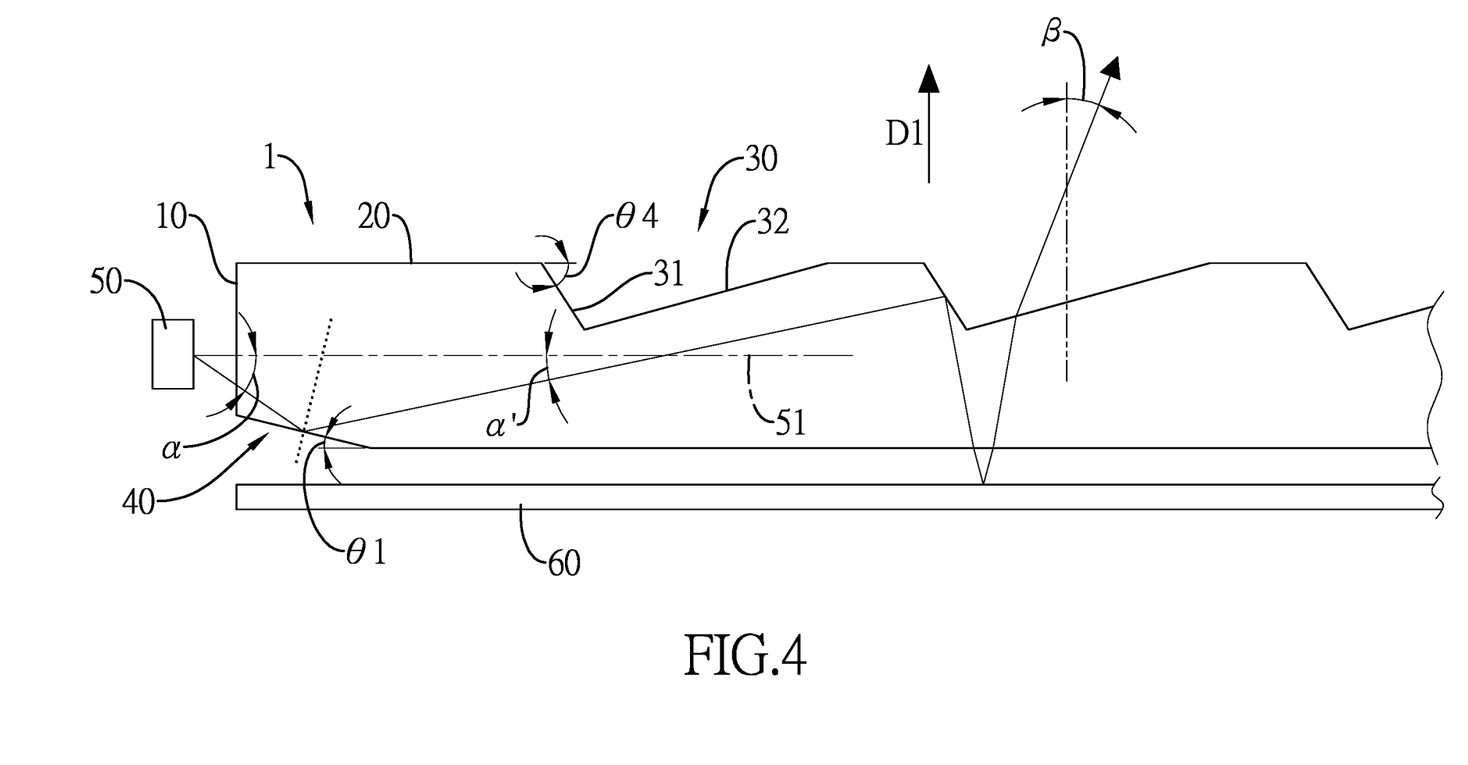
FIG. 4 is an enlarged side view illustrating light paths of a display device in accordance with the present invention.

The light-emitting unit 50 has an optical axis 51 aligned with a thickness middle point from the top side to the bottom side of the light guide plate 1. With reference to FIG. 4, an angle of incidence α is formed between the light emitted by the light-emitting unit 50 toward the light guide plate 1 and the optical axis 51. Rays with the angle of incidence α larger than 10 degrees (i.e. large-angle rays) will be reflected by the inclined surface structure 40, so an incident angle thereof at the light-facing surface 31 can be adjusted. Therefore, the reflected angle of the light reflected by the light-facing surface 31 will be adjusted to a more effective angle so that the light propagates toward the bottom side of the light guide plate 1 with improving light utilization efficiency. Preferably, through adjustment of the first inclined surface 41, rays with the angle of incidence α within a range of 10 to 35 degrees will be emitted from the light-emitting surface 20 of the light guide plate 1 in a normal angle of view within an offset between ±15 degrees from, so as to improve the overall brightness of the light-emitting surface 20. The normal angle of view is perpendicular to the light-emitting surface 20. In the embodiment of the present invention, with reference to FIG. 4, the normal angle of view is presented by a two-dot chain line.

Moreover, with reference to FIG. 3, a first direction D1 is defined as a direction from the top side to the bottom side of the light guide plate 1. The normal angle of view is parallel to the first direction D1. The inclined surface structure 40 has a height h along the first direction D1. The height h is smaller than a half of the difference of a thickness $T_B$ from the top side to the bottom side of the light guide plate 1 and a thickness $T_L$ of the light-emitting unit 50 along the first direction D1, i.e. $h<(T_B-T_L)/2$. By the inequality of the height h of the inclined surface structure 40, it makes sure that an emitting surface of the light-emitting unit 50 is fully aligned to the light-incident surface 10 of the light guide plate 1, so the light emitted by the light-emitting unit 50 is fully projected into the light-incident surface 10 without escaping from the inclined surface structure 40. Thereby, it can avoid problems of the light utilization efficiency and uneven light emission of brighter portions of the light-emitting surface 20 near the light-emitting unit 50 due to the light escaping from the inclined surface structure 40.

In an exemplary embodiment, the thickness $T_L$ of the light-emitting unit 50 is 0.3 mm, the light guide plate 1 with the thickness $T_B$ of 0.5 mm is adopted, so the height h of the inclined surface structure 40 is smaller than 0.1 mm. Considering the condition of the first angle θ1 being not larger than 8 degrees, a length of the first inclined surface 41 is not smaller than 0.7185 mm. Further, when the first angle θ1 is 1 degree, the length of the first inclined surface 41 is 5.80 mm.

In another exemplary embodiment, the thickness $T_L$ of the light-emitting unit 50 is 0.3 mm, the light guide plate 1 with the thickness $T_B$ of 0.6 mm is adopted, so the height h of the inclined surface structure 40 is smaller than 0.15 mm. Considering the condition of the first angle θ1 being not larger than 8 degrees, a length of the first inclined surface 41 is not smaller than 1.0778 mm. Further, when the first angle θ1 is 1 degree, the length of the first inclined surface 41 is 8.5948 mm. That is to say, the length of the inclined surface structure 40 has a millimeter scale, differing from micrometer-scale or nanometer-scale microstructures formed on bottom surfaces of conventional light guide plates for breaking total internal reflection.

With reference to FIG. 4, an embodiment of a display device in accordance with the present invention comprises the front light module as described above and a display panel 60 disposed at a spaced interval from the bottom side of the light guide plate 1, wherein an angle of refraction β is formed between the light emitted from the light-emitting surface 20 of the light guide plate 1 and the first direction D1.

When the light-emitting unit 50 projects light toward the light-incidence surface 10 of the light guide plate 1, if the angle of incidence α is smaller, namely the angle of incidence α falls within 0 to 10 degrees including end points, the light will be projected to the light-facing surfaces 31 of the multiple light guide structures 30 and then reflected toward the display panel 60 on the bottom side of the light guide plate 1. The display panel 60 further reflects the light toward the light-emitting surface 20 of the light guide plate 1, so the light is refracted by the opposite light-facing surfaces 32 of the multiple light guide structures 30 and emits from the light-emitting surface 20 at a smaller angle of refraction β.

Preferably, the angle of refraction β falls within 0 to 15 degrees, including end points.

Otherwise, if the angle of incidence α of the light is larger, namely the angle of incidence α falls within 10 to 35 degrees, and the light travels near the bottom side of the light guide plate 1, with reference to FIG. 4, taking the first embodiment of the light guide plate 1 adapted for a display device as an example, the light arrives at the first inclined surface 41 at the angle of incidence α, and the light is reflected by the first inclined surface 41 in a direction symmetric to an incident direction about a normal direction of the first inclined surface 41. Therefore, the light reflected by the first inclined surface 41 forms a secondary incident angle α' with the optical axis 51. The secondary incident angle α' is a difference of the angle of incidence α and double of the first angle θ1, i.e. α'=α−2×θ1. By decreasing the angle of incidence α to the secondary incident angle α', the light can be projected toward the light-facing surfaces 31 of the multiple light guide structures 30. Following by designing the fourth angle θ4, the light can be projected toward the display panel 60 then be reflected and be eventually refracted by the opposite light-facing surfaces 32 of the multiple light guide structures 30 at a preferable angle of refraction β so as to be well-utilized. Thereby, brightness of the display device in accordance with the present invention is effectively improved, and make the angle of refraction β of the light approach to the normal angle of view. In other words, the viewing angle lead to converge toward a center, thereby improving light emitting efficiency of the normal angle of view.

With reference to the following Table 1, how existence of the inclined surface structure 40 affects light-emitting energy of the display device is shown. In all comparative examples, there are same microstructures on the light-emitting surfaces 20, and the light guide plate 1 with the inclined surface structure 40 improves light-emitting energy by 17% to 69%. Therefore, the inclined surface structure 40 of the light guide plate 1 effectively improves light-emitting brightness of the display device

TABLE 1

|  | Comparative example 1 | Comparative example 2 | Comparative example 3 |
|---|---|---|---|
| Light-emitting surface | Laser dot microstructure | V-shaped dot microstructure | V-shaped strip microstructure |
| Light-emitting energy without inclined surface structure | 8.49 nits | 334 nits | 377 nits |
| Light-emitting energy with inclined surface structure | 14.35 nits | 391 nits | 441 nits |
| Ratio of improvement of light-emitting energy | 69% | 17% | 17% |

The following Table 2 shows how the first angle θ1 of the first inclined surface 41 of the light guide plate 1 and the fourth angle θ4 of the light-facing surface 31 of each one of the multiple light guide structures 30 affect light-emitting brightness of the display device. Given light-emitting brightness of a display device without the inclined surface structure 40 as a standard, different values of the first angle θ1 and the fourth angle θ4 are compared. With reference to Table 2, compared to the case that the first angle θ1 is 0 degree (that is, there is no inclined surface structure), the brightness ratio being 100% and the case that the first angle θ1 is 9 degrees, and the brightness ratio being 90%, when the first angle θ1 is larger than 0 degree and is smaller than or equal to 8 degrees, the brightness ratio can be improved to 112% to 116%.

TABLE 2

| First angle θ1 | Fourth angle θ4 | Ratio of brightness |
|---|---|---|
| 0 | 42 | 100% |
| 1 | 42.5 | 112% |
| 3 | 43.5 | 116% |
| 8 | 46 | 112% |
| 9 | 46.5 | 90% |

Furthermore, with reference to FIG. 2, in a second embodiment of the light guide plate 1 in accordance with the present invention, the inclined surface structure 40 comprises a second inclined surface 42 connected to the light-incident surface 10 and a third inclined surface 43 connected to the second inclined surface 42 and the bottom side of the light guide plate 1. A second angle θ2 is included by the second inclined surface 42 and an imaginary plane being parallel to the bottom side of the light guide plate 1, and a third angle θ3 is included by the third inclined surface 43 and the bottom side of the light guide plate 1. Preferably, the second angle θ2 is larger than 3 degrees and is smaller than or equal to 8 degrees, i.e. 3°<θ2≤8°, and the third angle θ3 is larger than 0 degree and is smaller than or equal to 3 degrees, i.e. 0°<θ3≤3°. Since the second inclined surface 42 is closer to the light-incident surface 10 in comparison with the third inclined surface 43, the second inclined surface 42 is also defined as a front inclined surface 42, the third inclined surface 43 is also defined as a rear inclined surface 43, the second angle θ2 is also defined as a front inclined angle θ2, and the third angle θ3 is also defined as a rear inclined angle θ3.

When the angle of incidence α falls within 22 to 35 degrees, the light is projected to the second inclined surface 42 of the inclined surface structure 40, and when the angle of incidence α falls within 10 to 22 degrees, the light is projected to the third inclined surface 43 of the inclined surface structure 40. By the second angle θ2 of the second inclined surface 42 and the third angle θ3 of the third inclined surface 43 having different degrees, the inclined surface structure 40 can control light paths in the light guide plate 1 more precisely, so rays with larger or smaller angles of incidence α can be precisely projected to the light-facing surfaces 31 of the multiple light guide structures 30, thereby improving light-emitting brightness.

Preferably, a ratio of an area of the second inclined surface 42 over an area of the third inclined surface 43 is larger than 0 and is smaller than or equal to 1, i.e. $0<A_A/A_B\leq1$, wherein $A_A$ is the area of the second inclined surface 42, and $A_B$ is the area of the third inclined surface 43. Since the area of the second inclined surface 42 equals to a length $L_A$ of the second inclined surface 42 being multiplied by a width of the light guide plate 1, and the area of the third inclined surface 43 equals to a length $L_B$ of the third inclined surface 43 being multiplied by a width of the light guide plate 1, with reference to FIG. 2, a ratio of the length $L_A$ of the second inclined surface 42 over the length $L_B$ of the third inclined surface 43 is larger than 0 and smaller than or equal to 1, i.e. satisfying $0<L_A/L_B\leq1$. When the angle of incidence α is larger, the light arrives at the inclined surface structure 40 after traveling a shorter distance along the optical axis 51, and falls on the second inclined surface 42. When the angle of incidence α is smaller, the light travels a longer distance along the optical axis 51, and falls on the third inclined surface 43.

Therefore, the area of the second inclined surface 42 closer to the light-emitting unit 50 is able to be smaller than the area of the third inclined surface 43. By the ratio of the areas of the second inclined surface 42 and the third inclined surface 43, the inclined surface structure 40 is capable of cooperating with the light-emitting unit 50 in a better way so as to improve light utilization efficiency. In other words, because among rays emitted by the light-emitting unit 50, a proportion of rays with an angle of incidence α larger than 22 degrees is small, luminous intensity of such rays is weak, and such rays are only projected to the second inclined surface 42 near the light-emitting unit 50, the area of the second inclined surface 42 may be smaller than the area of the third inclined surface 43. That is, utilizing the third inclined surface 43 to adjust rays with an angle of incidence α within 10 to 22 degrees is a main means to improve brightness. In the second embodiment of the present invention, the second angle θ2 is larger than the third angle θ3, and the area of the third inclined surface 43 is larger than that of the second inclined surface 42, so the inclined surface structure 40 can utilize the third inclined surface 43 to adjust rays with an angle of incidence α within 10 to 22 degrees and utilize the second inclined surface 42 to adjust rays with an angle of incidence α within 22 to 35 degrees, in favor of improving brightness of the display device.

In conclusion, when the light-emitting unit 50 of the front light module projects light toward the light guide plate 1, rays with a smaller angle of incidence α can be reflected by the light guide structures 30 of the light guide plate 1 toward the display panel 60 and be reflected again, and can be emitted from the light-emitting surface 20 of the light guide plate 1 at a smaller angle of refraction β. When rays with a larger angle of incidence α enters the light guide plate 1, since the light is reflected by the inclined surface structure 40, the angle of incidence α can be reduced, and the light can be also emitted at a smaller angle of refraction β. That is to say, the viewing angle lead to converge toward the center, light-emitting efficiency at the normal angle of view is able to improve, and thereby light utilization efficiency and light-emitting brightness of the display device of the present invention are improved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A light guide plate having a top side and a bottom side that are opposite to each other and the light guide plate comprising:
    a light-incident surface located at an end of the light guide plate;
    a light-emitting surface located on the top side of the light guide plate and connected to the light-incident surface;
    multiple light guide structures disposed on the light-emitting surface of the light guide plate, and each one of the multiple light guide structures having a light-facing surface; and
    an opposite light-facing surface connected to a side of the light-facing surface away from the light-incident surface; and
    an inclined surface structure connected to the light-incident surface and the bottom side of the light guide plate, wherein
    the inclined surface structure comprises a first inclined surface; and
    an inclined surface angle is included by the first inclined surface and the bottom side of the light guide plate, and satisfies:
    0°<θ1≤8°, wherein θ1 is the inclined surface angle.

2. The light guide plate as claimed in claim 1, wherein the inclined surface structure further comprises a front inclined surface connected to the light-incident surface and a rear inclined surface connected to the front inclined surface and the bottom side of the light guide plate;
    a front inclined angle is included by the front inclined surface and an imaginary plane being parallel to the bottom side of the light guide plate, and satisfies:
    3°<θ2≤8°, wherein θ2 is the front inclined angle; and
    a rear inclined angle is included by the rear inclined surface and the bottom side of the light guide plate, and satisfies:
    0°<θ3≤3°, wherein θ3 is the rear inclined angle.

3. The light guide plate as claimed in claim 2, wherein a ratio of an area of the front inclined surface over an area of the rear inclined surface satisfies:
    0<$A_A/A_B$≤1, wherein $A_A$ is the area of the front inclined surface, and $A_B$ is the area of the rear inclined surface.

4. The light guide plate as claimed in claim 1, wherein a light-facing surface angle is included by the light-facing surface of each one of the multiple light guide structures and the light-emitting surface, and satisfies:
    42°<θ4≤46°, wherein θ4 is the light-facing surface angle.

5. A front light module comprising:
    the light guide plate as claimed in claim 1; and
    a light-emitting unit configured to emit light toward the light-incident surface of the light guide plate.

6. The front light module as claimed in claim 5, wherein the light-emitting unit has an optical axis aligned with a thickness middle point from the top side to the bottom side of the light guide plate.

7. The front light module as claimed in claim 5, wherein the inclined surface structure has a height along a first direction;
    the first direction is parallel to a direction extending from the top side to the bottom side of the light guide plate; and
    the height satisfies:
    h<$(T_B-T_L)/2$, wherein h is the height, $T_B$ is a thickness from the top side to the bottom side of the light guide plate, and $T_L$ is a thickness of the light-emitting unit along the first direction.

8. A display device comprising:
    the front light module as claimed in claim 5; and
    a display panel disposed at a spaced interval from the bottom side of the light guide plate.

9. A light guide plate having a top side and a bottom side that are opposite to each other, the light guide plate comprising:
    a light-incident surface located at an end of the light guide plate;
    a light-emitting surface located on the top side of the light guide plate and connected to the light-incident surface;

multiple light guide structures disposed on the light-emitting surface of the light guide plate, and each one of the multiple light guide structures having
a light-facing surface, and
an opposite light-facing surface connected to a side of the light-facing surface away from the light-incident surface; and
an inclined surface structure connected to the light-incident surface and the bottom side of the light guide plate, wherein
the inclined surface structure comprises a first inclined surface;
an inclined surface angle is included by the first inclined surface and the bottom side of the light guide plate;
a light-facing surface angle is included by the light-facing surface of each one of the multiple light guide structures and the light-emitting surface; and
the inclined surface angle and the light-facing surface angle satisfy:
θ4=0.5×θ1+42°, wherein θ1 is the inclined surface angle, and θ4 is the light-facing surface angle.

10. A front light module comprising:
the light guide plate as claimed in claim 9; and
a light-emitting unit configured to emit light toward the light-incident surface of the light guide plate.

11. The front light module as claimed in claim 10, wherein the light-emitting unit has an optical axis aligned with a thickness middle point from the top side to the bottom side of the light guide plate.

12. The front light module as claimed in claim 10, wherein
the inclined surface structure has a height along a first direction;
the first direction is parallel to a direction extending from the top side to the bottom side of the light guide plate; and
the height satisfies:
h<$(T_B-T_L)/2$, wherein h is the height, $T_B$ is a thickness from the top side to the bottom side of the light guide plate, and $T_L$ is a thickness of the light-emitting unit along the first direction.

13. A display device comprising:
the front light module as claimed in claim 10; and
a display panel disposed at a spaced interval from the bottom side of the light guide plate.

* * * * *